United States Patent
Pike et al.

(10) Patent No.: US 11,593,726 B2
(45) Date of Patent: Feb. 28, 2023

(54) SYSTEM FOR COLLECTING AND ANALYZING EQUIPMENT TELEMATIC DATA

(71) Applicant: PIKE ENTERPRISES, LLC, Mount Airy, NC (US)

(72) Inventors: J. Eric Pike, Lewisville, NC (US); Cliff Edwards, Winston-Salem, NC (US); Will Crouch, Winston-Salem, NC (US)

(73) Assignee: PIKE ENTERPRISES, LLC, Mount Airy, NC (US)

( * ) Notice: Subject to any disclaimer, the term of this patent is extended or adjusted under 35 U.S.C. 154(b) by 0 days.

(21) Appl. No.: 16/737,276

(22) Filed: Jan. 8, 2020

(65) Prior Publication Data
US 2020/0219037 A1    Jul. 9, 2020

Related U.S. Application Data

(60) Provisional application No. 62/789,890, filed on Jan. 8, 2019.

(51) Int. Cl.
*G06Q 10/06* (2012.01)
*G07C 5/08* (2006.01)
(Continued)

(52) U.S. Cl.
CPC ..... *G06Q 10/063114* (2013.01); *G06N 20/00* (2019.01); *G07C 5/008* (2013.01); *G07C 5/085* (2013.01); *G07C 5/0808* (2013.01)

(58) Field of Classification Search
CPC ............... G06Q 40/08; G06Q 10/06; G06Q 10/063114; G06Q 10/10; G07C 5/008; G05B 19/0425; G05B 23/0221
See application file for complete search history.

(56) References Cited

U.S. PATENT DOCUMENTS 6,732,031 B1    5/2004 Lightner et al.
6,957,133 B1   10/2005 Hunt et al.
(Continued)

FOREIGN PATENT DOCUMENTS

JP    2005326965 A  *  11/2005

OTHER PUBLICATIONS

A. Hammad, et al. "Towards the smart construction site: Improving productivity and safety of construction projects using multi-agent systems . . . " Proceedings of the 2012 Winter Simulation Conference, 2012, pp. 1-12, doi:10.1109/WSC.2012.6465160. ieeexplore.ieee.org/document/6465160?source=IQplus (Year: 2012).*

*Primary Examiner* — Jerry O'Connor
*Assistant Examiner* — Michael R Koester
(74) *Attorney, Agent, or Firm* — Moore & Van Allen PLLC

(57) ABSTRACT

A system for collecting and analyzing equipment telematic data typically includes a processor, a memory, and an analysis module stored in the memory. The analysis module is typically configured for: receiving telematic data from a piece of equipment; parsing the telematic data to identify (i) location information and (ii) usage information for one or more tools; analyzing the telematic data to determine whether a job site condition has been satisfied; in response to determining that the job site condition has been satisfied, identifying a first job site location based on the location information of the telematic data; determining that the first job site location is not within an existing job site; and updating a job site database to include the first job site location.

18 Claims, 6 Drawing Sheets

(51) Int. Cl.
*G06N 20/00* (2019.01)
*G07C 5/00* (2006.01)
*G06Q 10/0631* (2023.01)

(56) References Cited

U.S. PATENT DOCUMENTS

| | | |
|---|---|---|
| 7,228,211 B1 | 6/2007 | Lowrey et al. |
| 7,904,219 B1 | 3/2011 | Lowrey et al. |
| 8,244,779 B2 | 8/2012 | Borg et al. |
| 9,563,869 B2 | 2/2017 | McQuade et al. |
| 2013/0096799 A1* | 4/2013 | Horne .................. E02F 9/26 |
| | | 701/99 |
| 2013/0138466 A1* | 5/2013 | Kahle ............ G06Q 10/063114 |
| | | 705/7.15 |
| 2015/0217981 A1 | 8/2015 | Baillargeon et al. |
| 2017/0372431 A1 | 12/2017 | Perl et al. |
| 2018/0005461 A1 | 1/2018 | Steketee et al. |
| 2020/0103906 A1* | 4/2020 | O'Donnell ............ E01C 19/004 |

* cited by examiner

SYSTEM FOR COLLECTING AND ANALYZING EQUIPMENT TELEMATIC DATA

CROSS-REFERENCE TO PRIORITY APPLICATION

This application claims the benefit of U.S. Provisional Patent Application Ser. No. 62/789,890 entitled "SYSTEM FOR COLLECTING AND ANALYZING EQUIPMENT TELEMATIC DATA" (filed Jan. 8, 2019), which is hereby incorporated by reference in its entirety.

BACKGROUND

In many fields, such as electrical line work, construction, mining, oil or gas drilling, farming, fishing, and the like, it may be desirable to track the time equipment and personnel are performing work at a job site, as opposed to time spent performing other activities, such as traveling, collecting materials at a yard, and taking meal breaks. Accordingly, a need exists for an improved way of tracking the time equipment and personnel are performing work at a job site.

SUMMARY

In one aspect, the present invention embraces a system for collecting and analyzing equipment telematic data to accomplish various tasks, such as identifying job site locations. The system typically includes a processor, a memory, and a network communication device. The system also typically includes an analysis module stored in the memory and executable by the processor. In one embodiment, the analysis module is configured for: receiving, via the network communication interface, telematic data from a piece of equipment; parsing the telematic data to identify (i) location information and (ii) usage information for one or more tools associated with the equipment (e.g., (i) a tool that is an integrated component of the equipment or (ii) a handheld tool); analyzing the telematic data to determine whether a job site condition has been satisfied; determining that the job site condition has been satisfied; in response to determining that the job site condition has been satisfied, identifying a first job site location based on the location information of the telematic data; retrieving location information for existing job sites from a job site database; determining whether the first job site location is within one of the existing job sites; and in response to determining that the first job site location is not within one of the existing job sites, updating the job site database to include the first job site location.

In one particular embodiment, either alone or in combination with other particular embodiments, analyzing the telematic data to determine whether a job site condition has been satisfied comprises (i) determining whether the one or more tools have been used or (ii) using a machine learning algorithm to determine whether the job site condition has been satisfied.

In another particular embodiment, either alone or in combination with other particular embodiments, the analysis module is configured for: receiving, via the network communication interface, image data from the piece of equipment; and analyzing the image data; wherein determining that the job site condition has been satisfied is based at least in part on analyzing the image data.

In another particular embodiment, either alone or in combination with other particular embodiments, analyzing the image data comprises identifying one or more objects associated with the job site condition.

In another particular embodiment, either alone or in combination with other particular embodiments, one or more tools comprise (i) a tool that is an integrated component of the equipment or (ii) a handheld tool.

In another particular embodiment, either alone or in combination with other particular embodiments, the telematic data comprises a plurality of telematic datasets.

In another particular embodiment, either alone or in combination with other particular embodiments, the analysis module is configured for determining an activity and/or location associated with each of the telematic datasets.

In another particular embodiment, either alone or in combination with other particular embodiments, the analysis module is configured for determining a total time the piece of equipment is associated with each of a plurality of activities and/or locations.

In another particular embodiment, either alone or in combination with other particular embodiments, the analysis module is configured for determining a total time the piece of equipment spent at the first job site location during a defined time period.

In another particular embodiment, either alone or in combination with other particular embodiments, the system comprises the piece of equipment, wherein the piece of equipment comprises one or more sensors that collect telematic data.

In another aspect, the present invention embraces a method for collecting and analyzing equipment telematic data. The method typically comprises receiving, via one or more computer processors, telematic data from a piece of equipment; parsing, via one or more computer processors, the telematic data to identify (i) location information and (ii) usage information for one or more tools associated with the equipment; analyzing, via one or more computer processors, the telematic data to determine whether a job site condition has been satisfied; determining, via one or more computer processors, that the job site condition has been satisfied; in response to determining that the job site condition has been satisfied, identifying, via one or more computer processors, a first job site location based on the location information of the telematic data; retrieving, via one or more computer processors, location information for existing job sites from a job site database; determining, via one or more computer processors, whether the first job site location is within one of the existing job sites; and in response to determining that the first job site location is not within one of the existing job sites, updating, via one or more computer processors, the job site database to include the first job site location.

In one particular embodiment, either alone or in combination with other particular embodiments, analyzing the telematic data to determine whether a job site condition has been satisfied comprises (i) determining whether the one or more tools have been used or (ii) using a machine learning algorithm to determine whether the job site condition has been satisfied.

In another particular embodiment, either alone or in combination with other particular embodiments, the method comprises receiving, via the network communication interface, image data from the piece of equipment; and analyzing the image data; wherein determining that the job site condition has been satisfied is based at least in part on analyzing the image data.

In another particular embodiment, either alone or in combination with other particular embodiments, analyzing the image data comprises identifying one or more objects associated with the job site condition.

In another particular embodiment, either alone or in combination with other particular embodiments, the one or more tools comprise (i) a tool that is an integrated component of the equipment or (ii) a handheld tool.

In another particular embodiment, either alone or in combination with other particular embodiments, the telematic data comprises a plurality of telematic datasets.

In another particular embodiment, either alone or in combination with other particular embodiments, the method comprises determining an activity and/or location associated with each of the telematic datasets.

In another particular embodiment, either alone or in combination with other particular embodiments, the method comprises determining a total time the piece of equipment is associated with each of a plurality of activities and/or locations.

In another particular embodiment, either alone or in combination with other particular embodiments, the method comprises determining a total time the piece of equipment spent at the first job site location during a defined time period.

In another aspect, the present invention embraces a computer program product for collecting and analyzing equipment telematic data. The computer program product typically comprises a non-transitory computer-readable medium comprising computer-readable instructions that, when executed by a computer processor, cause the computer processor to perform the steps of: receiving telematic data from a piece of equipment; parsing the telematic data to identify (i) location information and (ii) usage information for one or more tools associated with the equipment; analyzing the telematic data to determine whether a job site condition has been satisfied; determining that the job site condition has been satisfied; in response to determining that the job site condition has been satisfied, identifying a first job site location based on the location information of the telematic data; retrieving location information for existing job sites from a job site database; determining whether the first job site location is within one of the existing job sites; and in response to determining that the first job site location is not within one of the existing job sites, updating the job site database to include the first job site location.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
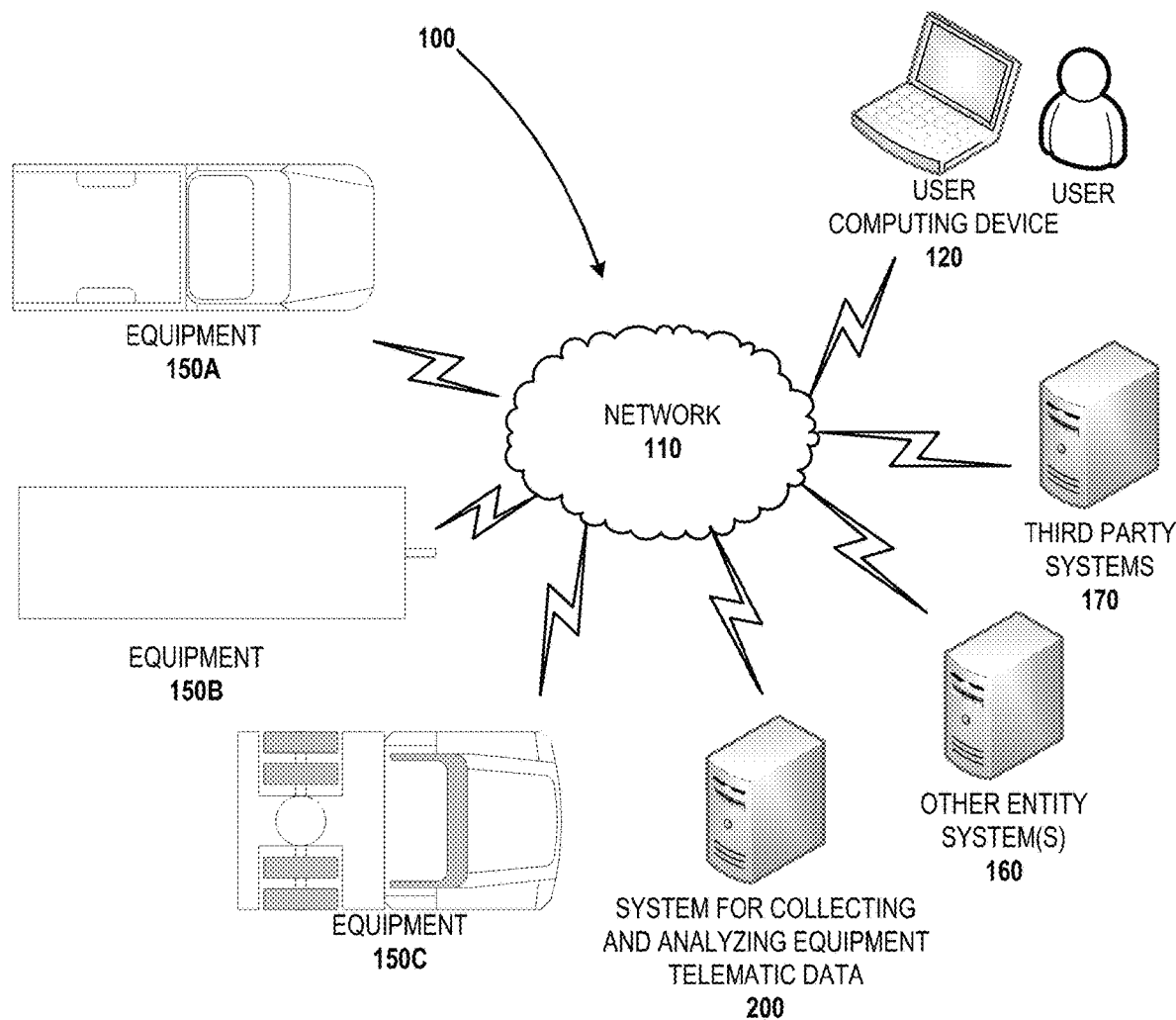
Figure 2:
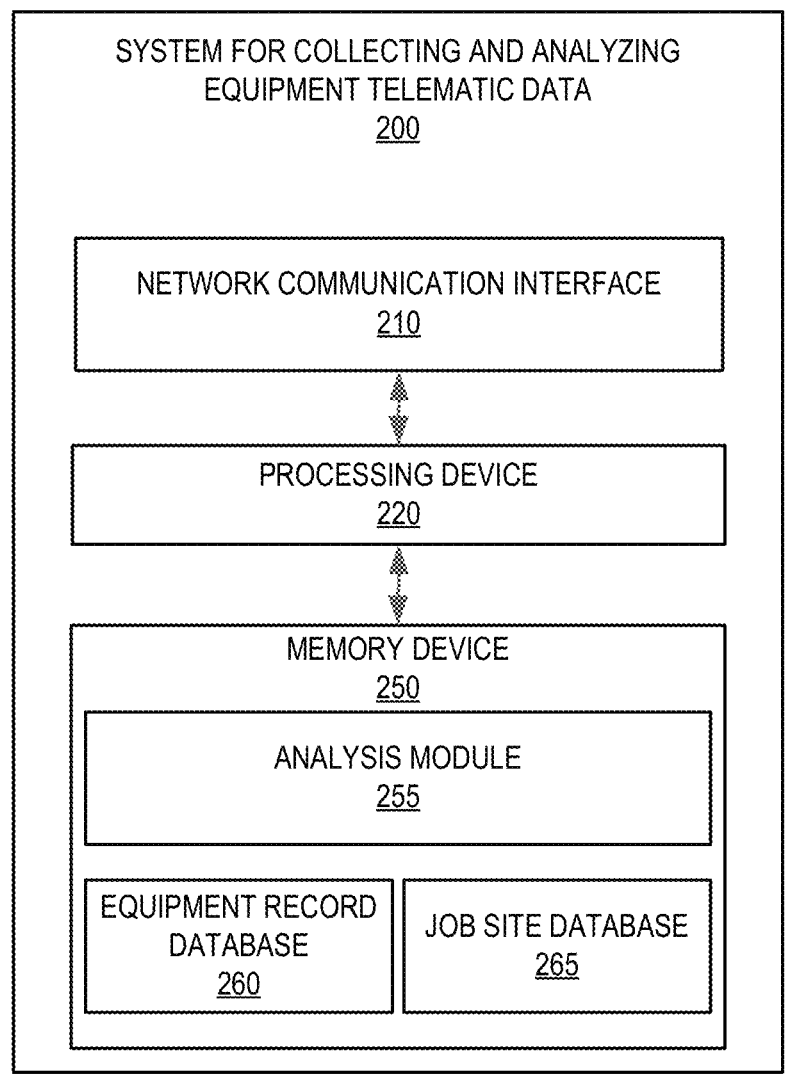
Figure 3A:
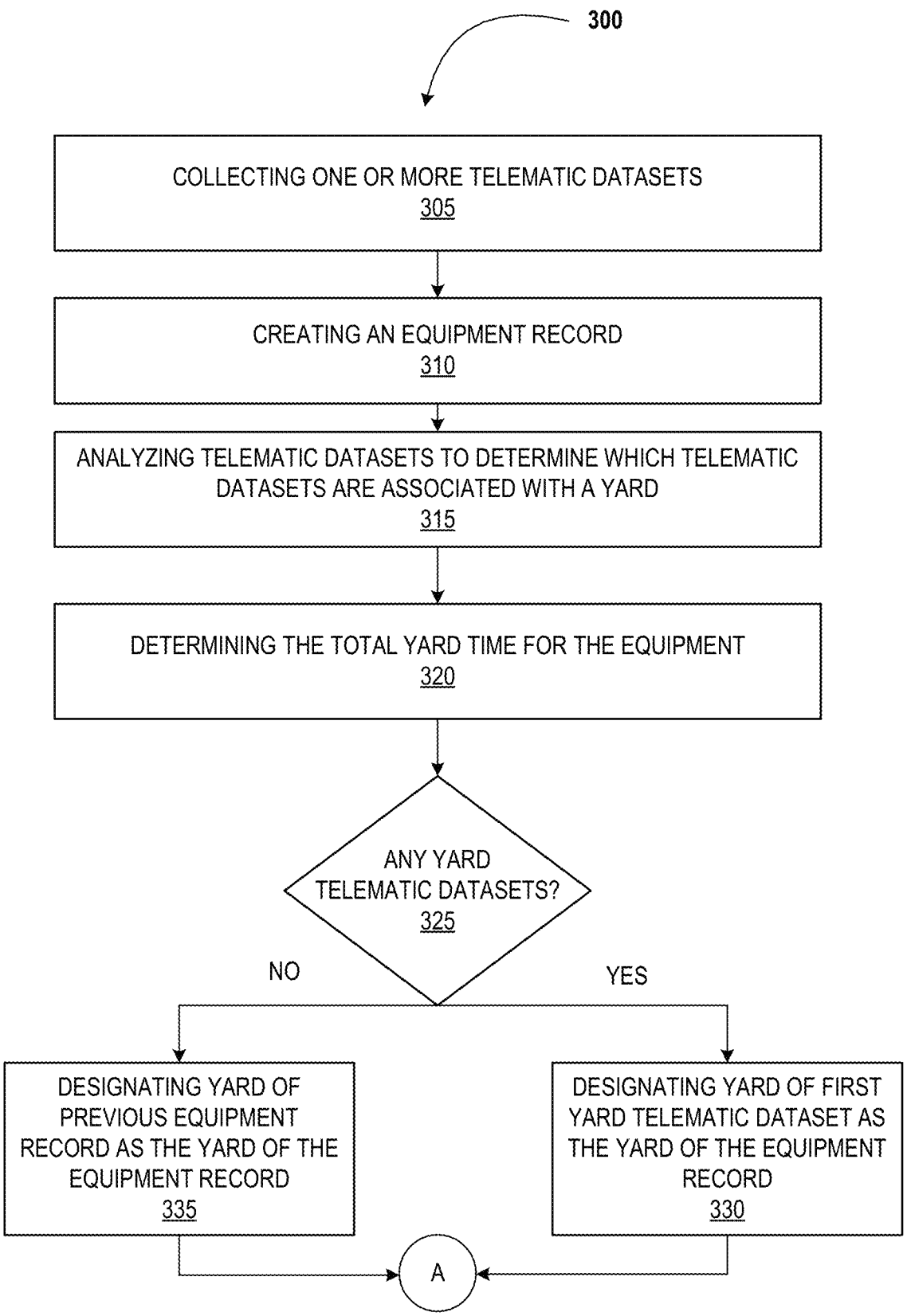
Figure 3B:
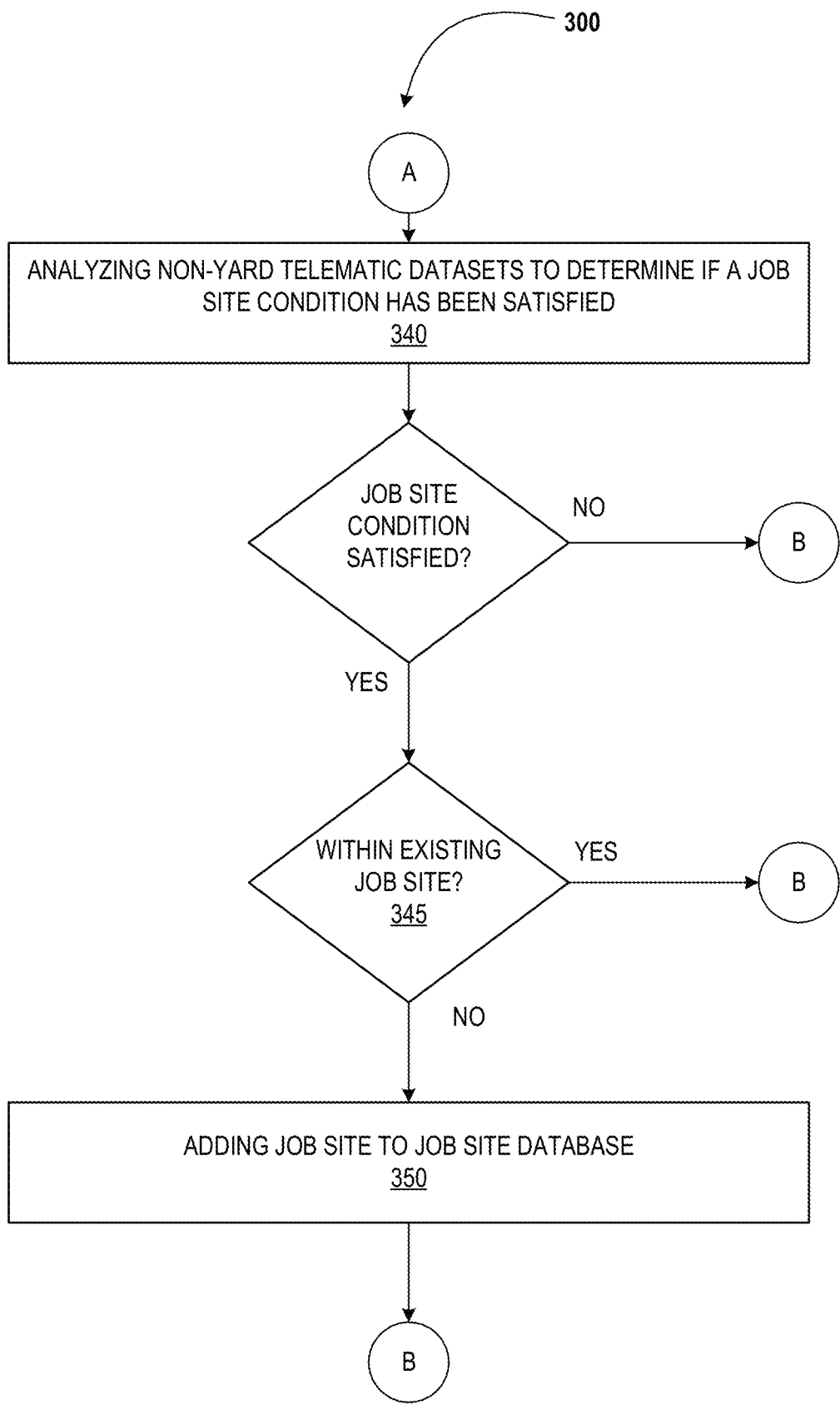
Figure 3C:
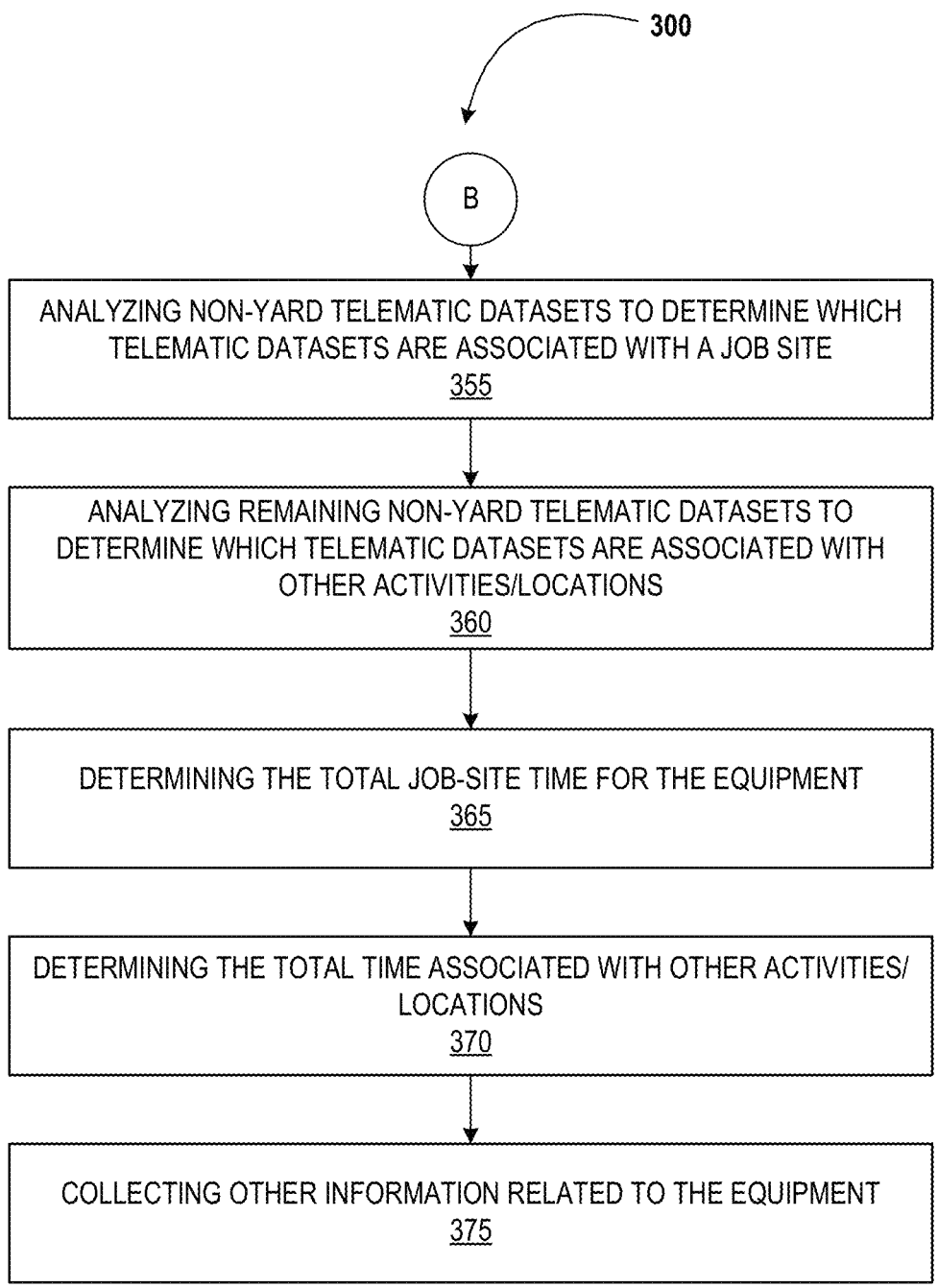
Figure 4:

Having thus described embodiments of the invention in general terms, reference will now be made the accompanying drawings, wherein:

FIG. 1 depicts an operating environment in accordance with an aspect of the present invention;

FIG. 2 schematically depicts a system for collecting and analyzing equipment telematic data in accordance with an aspect of the present invention;

FIGS. 3A-3C depict a method for collecting and analyzing equipment telematic data in accordance with an aspect of the present invention; and FIG. 4 depicts an exemplary graphical user interface that may be used to provide aggregate information in accordance with an aspect of the present invention.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

An "entity" may be any person or organization implementing a system for collecting and analyzing equipment telematic data described herein. The entity may be an organization that performs work in the fields of electrical line work, construction, mining, oil or gas drilling, logging, farming, fishing, and the like. A "user" may be any person or entity using a system for collecting and analyzing equipment telematic data described herein. Often, a user is an employee of the entity. In some instances, a user of the system may be another computer system or software application that interacts with the system. For example, a user may be an automated agent that is configured to interact with the system in order to perform one or more tasks.

As used herein, "equipment" typically refers to vehicles or large machinery that may be employed in a variety of fields, including electrical line work, construction, mining, oil or gas drilling, farming, fishing, and the like. Equipment may include a truck, a trailer, a bucket truck, construction equipment (e.g., a bulldozer, dump truck, crane, or excavator), a tractor, and the like. Equipment may include sensors for collecting telematic data.

As used herein, "tool" typically refers to an individual item or device that may be used to accomplish a particular task related to a variety of fields, including electrical line work, construction, mining, oil or gas drilling, farming, fishing, and the like. A tool may be associated with a piece of equipment. In some instances, a tool may be an integrated component of a piece of equipment, such as the boom and bucket of a bucket truck. In some instances, a tool may be a handheld tool rather than a component of equipment. Exemplary handheld tools include: drills, saws, load break tools, hot sticks, hammers, clamps, cutting tools, shovels, etc. In some instances, a tool is a device that may be used to perform tasks at a job site and is in communication (e.g., via Bluetooth or other wireless communication) with a piece of equipment. For example, a tool may be a drone in communication with a vehicle.

"Telematic data" refers to data related to the operation of equipment. Telematic data may include data related to the location of equipment, such as GPS coordinates, and/or data related to the location of a tool associated with the equipment. If the equipment is a vehicle, telematic data may include data related to the speed and/or heading of the vehicle. Telematic data may include related to the use of tools associated with a piece of equipment. In this regard, telematic data may include data related to the use of tools that constitute components of equipment. For example, telematic data may include data related to the use of a motor or engine of a piece of equipment, which may indicate that the equipment is in use. By way of further example, telematic data may include data related to the use of a power takeoff (PTO) of a piece of equipment. If the equipment is a vehicle (e.g., a bucket truck), use of a PTO (e.g., to extend a bucket) may indicate that the vehicle is at a work site, rather than merely traveling. Telematic data may also include sensor data indicating that certain integrated tools of a piece of equipment are being used. For example, if the equipment is a bucket truck, telematic data may include data from a vehicle sensor indicating that the bucket of the bucket truck has been extended for use. Telematic data may include data related to the use of tools that are handheld tools.

An "equipment telematic dataset" is typically a data file generated by a piece of equipment (e.g., by a telematics device associated with the piece of equipment) that includes telematic data corresponding to a moment in time. For example, an equipment telematic dataset may include, among other things: an identifier of the applicable equipment (e.g., name, serial number, or other identifier), location information (e.g., GPS coordinates) for the equipment, a speed at which the equipment is traveling at that point in time, a travel heading, data related to the use of an engine/motor of the equipment, data related to the use of tools, such as integrated components of the equipment or handheld tools, and/or a time at which the equipment generated or transmitted the telematic dataset. A piece of equipment may periodically transmit equipment telematic datasets. In some instances, equipment telematic datasets may be transmitted at regular intervals (e.g., once per second or once per minute). A telematics dataset may include information about a single "event" or multiple "events." Such "events" may include: a change in speed, a change in heading/direction of travel, and/or use of certain components of the equipment (e.g., engine or PTO). A telematic dataset may include information about the events that occurred since the last telematic dataset was transmitted. In some instances, an equipment telematic dataset may be generated and transmitted each time a piece of equipment (e.g., a telematics device associated with the piece of equipment) identifies an "event."

A "job site" typically refers to a location where work is being performed by an entity. For example, a job site may be a construction site or a location where electrical line work is being performed. If the entity is performing work related to harvesting natural resources (e.g., mining, oil or gas drilling, logging, farming, or fishing), the job site may be the location where such natural resources are harvested.

As used herein, a "yard" typically refers to a location where equipment, tools and/or materials used at a job site may be stored. Before beginning work at a job site, employees of an entity may collect equipment, tools, and/or materials to be used at such job site. In some instances, a yard may be operated by the entity. In other instances, a yard may be operated by a customer for which an entity is tasked to perform work. In some embodiments, the location of a yard may be manually defined by an entity. In some embodiments, the location of a yard may be determined by analyzing (e.g., via machine learning) the location history of multiple pieces of equipment. For example, if multiple pieces of equipment have a history of leaving and then returning to the same geographic area, such geographic area may be defined as a "yard."

The location associated with a yard, job site, or other location may be defined by a "geo-fence." A "geo-fence" is a virtual perimeter that defines the boundaries of an actual geographic area (e.g., of a yard). A geo-fence may be defined by centroids, polygons, boundaries, etc. A geo-fence may be defined manually, through automated logic or calculations, through machine learning, etc.

In many fields, such as electrical line work, construction, mining, oil or gas drilling, farming, fishing, and the like, it may be desirable to track the time equipment and personnel are performing work at a job site, as opposed to time spent performing other activities, such as traveling, collecting materials at a yard, and taking meal breaks. However, one challenge relating to tracking time performing work at a job site is determining whether equipment and personnel are located at a job site. In some instances (e.g., performing construction or maintenance at a residence), the location of a job site may be readily defined by a street address. Once the job site has been defined, it may be possible to track the time equipment and personnel have spent at the job site by comparing location information (e.g., GPS coordinates) of such equipment and personnel with the defined location of the job site. However, in many fields, such as electrical line work, construction, mining, oil or gas drilling, farming, fishing, and the like, it is not practical or even possible to define a job site by street address. For example, the location of the job sites might not be sufficiently close to any street address, particularly where the job sites are located in rural or undeveloped areas. By way of further example, where work relates to repairing or replacing damaged electrical distribution lines and related equipment (e.g., as a result of a storm), the exact location of the job site(s) (e.g., where the electrical distribution lines are damaged) might not be known prior to work beginning. Furthermore, even where a particular job site may be correlated with a particular street address, requiring a work crew to provide the correct street address may be distracting, time consuming, and prone to incorrect entry of the street address.

To address these problems, in one aspect, the present invention is directed to a system for collecting and analyzing equipment telematic data in order to determine when such equipment is being used at a job site. In this regard, the system typically receives periodic telematic datasets from a piece of equipment. Such telematic datasets typically include location information (e.g., GPS coordinates) for such equipment. In some embodiments, such telematic datasets may include information related to the location of a tool associated with the equipment. The location of an associated tool may be used as a proxy for the location of the equipment. By comparing such location information with the location of known job sites, the system is able to determine whether, at any particular time, the equipment (as well as personnel associated with such equipment) is being used to perform work at a job site or is engaged in other activities (e.g., collecting materials at a yard, traveling to a job site, break time, and the like). By knowing the amount of time spent at a job site, as compared to time spent on other activities, the system may determine the productivity of the equipment (as well as personnel associated with such equipment).

Such equipment telematic datasets may also be used to identify previously undefined job sites. In this regard, equipment telematic datasets may include information about the use of various tools, some of which are primarily designed for use at a job site. For instance, equipment telematic datasets may indicate that a vehicle PTO has been engaged or that a boom of a vehicle (e.g., a bucket truck) has been extended. Accordingly, the system may analyze equipment telematic datasets to determine whether integrated tools (e.g., components) of a piece of equipment are being used in a manner indicative of such equipment being used at a job site. For example, if equipment telematic datasets indicate that the bucket of a bucket truck has been extended, then the bucket truck is likely being used to perform work at a job site. In another instance, equipment telematic datasets may indicate that handheld tools associated with a piece of equipment are being used. For example, a handheld tool (e.g., a hammer) may have an RFID tag and the equipment may have an RFID sensor for sensing whether the handheld tool is present at the vehicle or whether the handheld tool has moved passed the sensor. If the RFID sensor does not sense the RFID tag (or has sensed that the tool has left the vehicle by the RFID tag being detected in the proximity of an RFID sensor by a door of the equipment), then such handheld tool is likely being used at a job site. If tools (e.g., handheld tools or integrated components of equipment) are being used in such a manner, but such equipment is not located at a previously defined job site, then the system may define the current location of such equipment as a new job site. Accordingly, the system, among other things, is able to automatically determine the locations of job sites, and then use such locations to determine whether, at any given time, equipment (as well as personnel associated with such equipment) is being used to perform work at a job site.

Telematic data may also be combined with other information in equipment records. Such other information may include: identities of personnel associated with (e.g., assigned to) such equipment, such as the leader of a crew assigned to use the equipment; the number of worked hours submitted by such personnel (e.g., on a timesheet); a project identifier (e.g., project number) for which the equipment was used during the applicable time period; a line of business of an entity for which the equipment was used during the applicable time period; the type of work performed by the equipment and/or personnel; a geographic region in which the applicable yard and job site are located; and an identity of a customer for which work was performed by the equipment and/or personnel. Such equipment records may then be analyzed in connection with providing various functions. The system may analyze the job site locations in the equipment records to determine whether to update drawings or schematics maintained by an entity. In some embodiments, aggregate information may be used to identify trends and project future needs or problems.

FIG. 1 provides a block diagram illustrating an operating environment 100, in accordance with an embodiment of the present invention. As illustrated in FIG. 1, the operating environment 100 typically includes multiple pieces of equipment 150, illustrated by way of example in FIG. 1 as a truck 150A, a trailer 150B, and a tractor 150C. The equipment 150 may be able to generate and transmit equipment telematic datasets that include telematic data related to such equipment 150. Accordingly, each piece of equipment 150 may include one or more sensors (e.g., sensors for sensing the location, speed, heading, performance of integrated components, etc. of the equipment) for collecting telematic data, a controller for aggregating such telematic data and generating equipment telematic datasets, and a network interface for communicating such equipment telematic datasets. For example, the truck 150A may include a telematics device that connects to the truck's engine control module (ECM), as well as other sensors, and obtains GPS location data for the truck.

The operating environment 100 also typically includes a system 200 for collecting and analyzing equipment telematic data transmitted by the equipment 150. The system 200 and the equipment 150 are typically in communication with a network 110, such as the Internet, wide area network, local area network, wireless telephone network, Bluetooth network, near field network, or any other form of contact or contactless network. One or more users, each having a user computing device 120, such as a PC, laptop, mobile phone, tablet, television, mobile device, or the like, may be in communication with the system 200 via the network 110. In some embodiments, a user may be another computer system or software application that interacts with the system to perform one or more tasks. The system 200 may be in communication with other entity systems 160 (e.g., an enterprise resource planning (ERP) system), as well as various third party systems 170. In some embodiments, a third party system 170 collects telematic data transmitted by the equipment 150, and then the system 200 obtains this telematic data from such third party system 170.

FIG. 2 depicts the system 200 in more detail. As depicted in FIG. 2, the system 200 typically includes various features such as a network communication interface 210, a processing device 220, and a memory device 250. The network communication interface 210 includes a device that allows the system 200 to communicate with the equipment 150, user computing devices 120 (e.g., over the network 110 (shown in FIG. 1)), other entity systems 160, and/or third party systems 170.

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, the system 200 is configured to collect and analyze telematic data generated by the equipment 150 as described in more detail herein. Accordingly, the system 200 typically includes one or more modules stored in the memory device 250, which facilitate such analysis. As depicted in FIG. 2, the system 200 typically includes an analysis module 255 configured to perform such analysis.

In connection with its analysis of telematic data from the equipment 150, the system 200 typically generates equipment records. An "equipment record" typically includes information related to the use of a particular piece of equipment during a particular time period (e.g., during a particular day). An equipment record typically includes information related to the amount of time a piece of equipment spends in connection with various activities/locations (e.g., amount of time spent at a job site, yard, traveling, and the like). An equipment record may also include information related to the personnel using the equipment, the yard to which such equipment is assigned, the identity of projects worked on by the equipment/personnel, the tasks completed by the equipment/personnel during the time period, delays experienced during the time period, mileage, and weather during the time period. Equipment records generated by the system 200 may be stored in an equipment record database 260. Information associated with known job sites may be stored in a job site database 265

FIGS. 3A-3C, depict a method 300 of collecting and analyzing telematic data generated by a piece of equipment during a particular time period in accordance with an embodiment of the present invention. This method 300 may be performed by the system 200. The steps of the method 300 may be repeated for the same piece of equipment during different time periods, as well as for different pieces of equipment (during the same or different time periods).

At block 305, the method 300 includes collecting one or more telematic datasets related to a particular piece of equipment. In some embodiments, the equipment transmits the telematic datasets to a third party system, which then may transmit or make available (e.g., via an online portal) the telematic datasets to the system 200. Alternatively, these telematic datasets may be transmitted by the equipment directly to the system 200. The telematic datasets may be associated with a particular time period (e.g., the same day), and each piece of equipment may periodically transmit telematic datasets to the system 200 during such time period.

At block 310, an equipment record is created for the piece of equipment if a corresponding equipment record does not yet exist, and such equipment record may be stored in the equipment record database 260. This equipment record may be initially populated with an identifier of the equipment (e.g., name, serial number, etc.) as well as information regarding the applicable time period (e.g., a particular day).

At block 315, the telematic datasets are analyzed to determine which telematic datasets are associated with a yard. In this regard, each telematic dataset typically includes information related to the location of the equipment when the telematic dataset is transmitted by the equipment. This location information (e.g., longitude and latitude, GPS coordinates, and the like) is typically parsed from the telematic dataset and compared to location information for defined yards. This location information may relate to the location of a tool associated with the equipment, such that the location of the associated tool may be used as a proxy for the location of the equipment. If the location information of a telematic dataset corresponds to a particular yard (e.g., GPS coordinates within a telematic dataset are within a geo-fence associated with a particular yard), then such telematic dataset is associated with (e.g., assigned to) such yard and may be considered to be a "yard telematic dataset." Any telematic dataset that is not associated with a yard may be considered to be a "non-yard telematic dataset."

At block 320, the telematic datasets associated with a yard are analyzed to determine the total amount of time the piece of equipment has spent in a yard during the applicable time period. In this regard, each telematic dataset may include a timestamp indicating when such telematic dataset was generated or transmitted by the equipment. Based on the timestamps of the telematic datasets associated with a yard, the system 200 may be able to calculate the total time the piece of equipment has spent in a yard during the applicable time period. This total yard time may be included in the applicable equipment record.

At block 325, it is determined whether there are any yard telematic datasets (i.e., telematic datasets associated with a yard) that relate to the equipment record.

If there are yard telematic datasets that relate to the equipment record, then, at block 330, the yard of the first (e.g., earliest) yard telematic dataset is typically designated as the "yard" of the equipment record, and the equipment record may be updated accordingly.

If there are no yard telematic datasets that relate to the equipment record, then, at block 335, the yard of a previous equipment record (i.e., an equipment record associated with the same piece of equipment for an earlier time period) is typically assigned to be the "yard" of the equipment record. For example, the system may identify the equipment record for the equipment during a prior time period (e.g., the immediately preceding day or week) and define the yard of such equipment record as the yard of the current equipment record.

Next, the method 300 proceeds to the steps depicted in FIG. 3B, which relate to identifying new job sites. At block 340, the non-yard telematic datasets for the equipment are analyzed to determine if a job site condition has been satisfied. A job site condition is a condition (or set of conditions) that may be determined from the telematic datasets and which is indicative of the equipment being located at a job site. In some embodiments, a job site condition may be satisfied if a particular tool (e.g., an integrated component of equipment or a handheld tool) associated with the equipment has been used. Typically, such a condition relates to the use of a tool that is primarily designed for use on a job site. For example, a job site condition for a bucket truck may be satisfied if the PTO of the bucket truck has been engaged and/or a boom of the bucket truck has been extended. By way of further example, the equipment may be able to sense use of a handheld tool and such use may satisfy a job site condition. For example, the handheld tool may be in wireless communication with the equipment (e.g., via a Bluetooth connection), and the handheld tool may transmit a notification to the equipment that the handheld tool has been turned on or used. By way of further example, the equipment may be able to sense whether the tool is located within the equipment (e.g., by sensing or not sensing an RFID tag attached to the tool or determining that the equipment has lost a Bluetooth connection with the tool), and, if the tool is not located within the vehicle, the tool may be presumed to be in use. In some embodiments, there may be job site conditions that do not require use of tools to be satisfied. For example, another job site condition for a bucket truck may be satisfied if (i) the bucket truck has stopped for at least a defined period of time (e.g., at least five or ten minutes) and (ii) the bucket truck is not located at a defined non-yard site, such as not being located at a restaurant, gas station, hardware store, or the like. In some embodiments, job site conditions may be predefined by the entity. In some embodiments, job site conditions may be automatically determined by analyzing (e.g., through machine learning and/or natural language processing) previous telematic data, equipment records, and other data to identify tool uses indicative of job site locations.

If machine learning is used to determine job site conditions, a training set based on a large number (e.g., 1,000) equipment records may be used to initially train a machine learning algorithm to identify non-yard telematic datasets that satisfy known job site conditions. Once the machine learning algorithm has been trained, the machine learning algorithm may be used to determine whether a job site condition has been satisfied in subsequent non-yard telematic datasets. If the machine learning algorithm has a likelihood of being accurate that is above a defined threshold (e.g., 60% or 80%) then the machine learning algorithm may be used to determine whether a job site condition exists. On the other hand, if the machine learning algorithm has a likelihood of being accurate that is below a defined threshold, then conditional logic as described in the preceding paragraph may be used to determine whether the job site condition exists.

In some embodiments, the determination of whether a job site condition exists may be based at least on part on image data received from the equipment. In this regard, the equipment may provide images as part of, or in parallel with, the telematic datasets. These images may be captured from one or more cameras mounted to the equipment. The images may then be analyzed to identify objects that may be indicative of a job site condition generally (e.g., poles, cones, electrical equipment, wires, construction equipment, and the like) or indicative of a specific job site (e.g., features uniquely associated with a known job site). Machine learning may be employed to identify objects in images, as well as to identify objects and features indicative of a job site. Known third party services, such as Microsoft's Computer Visions (https://azure.microsoft.com/en-us/services/cognitive-services/computer-vision/) and Google's Vision AI (https://cloud.google.com/vision/), may be used to process such images to search for images that may be associated with a job site condition.

Similar to the determination of whether a job site condition exists, machine learning and/or images obtained from the equipment may also be employed to determine whether telematic datasets are associated with a yard.

If a job site condition has been satisfied, then, at block 345, it is determined whether the location of the equipment while the job site condition was satisfied is within an existing job site. The location of existing job sites may be determined by retrieving location information for existing job sites from the job site database 265.

If the location of the equipment while the job site condition was satisfied is not within an existing job site, then, at block 350, such location is designated a job site location and added to the job site database 265. In some embodiments, the system may designate the location of such new job site as being the area within defined distance (e.g., within 100-300 feet) of the location of the equipment at the time the job site condition was satisfied. In some instances, the system 200 may define a geo-fence corresponding to the location of the new job site.

Next, the method 300 proceeds to the steps depicted in FIG. 3C. At block 355, the non-yard telematic datasets are analyzed to determine which telematic datasets are associated with a job site. In some embodiments, if the location information of a telematic dataset corresponds to a particular job site (e.g., GPS coordinates within a telematic dataset are within a geo-fence associated with a particular job site), then such telematic dataset is associated with (e.g., assigned to) such job site. Similar to the determination of whether a job site condition exists, machine learning and/or images obtained from the equipment may be employed to determine which telematic datasets are associated with a job site.

At block 360, the remaining non-yard telematic datasets (i.e., those non-yard telematic datasets not associated with a job site) are analyzed to determine which telematic datasets are associated with other activities/locations. For example, the system 200 may determine whether the location information of each remaining non-yard telematic dataset corresponds to the location of a gas station, restaurant, or hardware store, and, if so, such telematic dataset may be designated a "gas" telematic dataset, "restaurant" telematic dataset, or "hardware" telematic dataset. Any still-remaining non-yard telematic datasets (i.e., those non-yard telematic datasets not associated with a job site or other location, such as a gas station, restaurant, or hardware store) may be designed as "travel" telematic datasets. In addition to or as an alternative to the categories of "gas", "restaurant", "hardware", and "travel", the system 200 may be configured to determine whether remaining non-yard telematic datasets are associated with other activities/locations. Similar to the determination of whether a job site condition exists, machine learning and/or images obtained from the equipment may be employed to determine the type of activity (e.g., "gas", "restaurant", "hardware", or "travel") associated with the remaining non-yard telematic datasets.

At block 365, the telematic datasets associated with a job site are analyzed to determine the total amount of time the piece of equipment has spent at a job site during the applicable time period. In this regard, each telematic dataset may include a timestamp indicating when such telematic dataset was generated or transmitted by the equipment. Based on the timestamps of the telematic datasets associated with a job site, the system 200 may be able to calculate the total time the piece of equipment has spent at a job site during the applicable time period. This total job site time may be included in the applicable equipment record, which, as described in more detail below, may be used, for example, in calculating various productivity metrics and identifying anomalies.

At block 370, the telematic datasets associated with other activities/locations (i.e., those telematic datasets associated with neither a job site nor yard) are analyzed to determine the total amount of time the piece of equipment has spent in connection with such other activities/locations during the applicable time period. For example, the system 200 may determine the total "gas" time, "restaurant" time, "hardware" time, and "travel" time for the equipment during the applicable time period. The applicable equipment record may then be updated to include the time related to any applicable categories of other activities/locations (e.g., "gas" time, "restaurant" time, "hardware" time, "travel" time, etc.).

At block 375, other information related to the equipment may be collected (e.g., from the other entity system(s) 160) and added to the applicable equipment record. For example, such other information may include: identities of personnel associated with such equipment, such as the leader of a crew assigned to use the equipment; the amount of worked hours submitted by such personnel (e.g., on a timesheet); a project identifier (e.g., project number) for which the equipment was used during the applicable time period; a line of business of the entity for which the equipment was used during the applicable time period; the type of work performed by the equipment and/or personnel; a geographic or other region in which the applicable yard and job site are located; and an identity of a customer for which work was performed by the equipment and/or personnel. In this regard, timesheets submitted by work crews and other data collected by the other entity systems 160 may identify the equipment used by the work crew, as well as the hours worked, tasks performed, delays experienced, etc. by the work crew, thereby facilitating the association of such crew information with the identity of the equipment.

By way of further example, where the piece of equipment is a vehicle, the total mileage traveled by such equipment during the applicable time period may be added to the applicable equipment record. Such other information may include an indication of whether the work performed by the equipment and/or personnel is associated with an emergency event (e.g., the work is being performed to repair damage from a natural disaster, such as a storm). Such other information may include weather-related information (e.g., temperature and amount of precipitation), which may be received by a data feed provided by a third party system 170. Such other information may include information about delays experienced by the equipment and/or personnel during the applicable time period, such as the type(s) of delay and amount of delay time. In this regard, a crew leader may submit such delay information (e.g., to the system 200 or to another entity system). Such other information may include information about the tasks performed by the equipment and/or personnel during the applicable time period, such as the types of tasks performed and the quantity of such tasks performed. For example, in the field of electrical line work such task information may identify the number of transformers or poles replaced during a particular time period. As noted, much of this other information may be collected from the other entity system(s) 160. Such information may be provided to such other entity system(s) 160 by personnel (e.g., a crew leader) associated with the equipment, such as in connection with such personnel completing timesheets and/or work orders for the entity.

As noted above, this method 300 for collecting and analyzing equipment may be repeated for the same piece of equipment during different time periods, as well as for different pieces of equipment (during the same or different time periods). Accordingly, the system 200 may generate equipment records for various pieces of equipment for different time periods. Once equipment records have been created, the system 200 may be configured to analyze such equipment records to provide useful information to the entity. For example, such information may be used to calculate various productivity metrics, identify anomalies, and the like.

In some embodiments, equipment records may be analyzed by the system 200 to identify potential anomalies. For example, each equipment record may be analyzed to determine if there is a discrepancy between the total number of telematic time associated with the applicable piece of equipment and the total time submitted by assigned personnel (e.g., timesheet hours). If there is a discrepancy between the total telematic time (e.g., "yard" time, "job site" time, "gas" time, "restaurant" time, "hardware" time, and "travel" time for the equipment during the applicable time period) and personnel time (e.g., a discrepancy of greater than ten percent or twenty percent), the system 200 may flag the equipment record and/or time sheet as having an anomaly, which may indicate that the equipment record and/or time sheet has incorrect data. The system 200 also may flag the equipment record as having an anomaly if the total amount of personnel time or telematic time during the applicable time period is below or above a defined threshold. In some embodiments, each equipment record may be analyzed to determine if the total time during the applicable time period associated with one or more non-job-site activities (e.g., "yard" time, "gas" time, "restaurant" time, "hardware" time, and/or "travel" time) exceeds a defined threshold, and, if so, the system 200 may flag the equipment record as having an anomaly. For example, the total number of "yard" hours exceeds a defined threshold, then the equipment and personnel may have spent too much time in a yard during the applicable time period. In some embodiments, the system 200 may determine whether multiple pieces of equipment associated with particular personnel (e.g., a crew leader) during a particular time period are all assigned to the same yard. If pieces of equipment associated with particular personnel (e.g., a crew leader) during a particular time period are assigned to different yards, then such personnel and/or yards may have been incorrectly associated with such equipment, and so the system 200 may flag the applicable equipment records. In some embodiments, the system 200 may transmit an alert to one or more users regarding any flagged equipment records so that such users may further investigate the cause of the flagged anomalies.

In some embodiments, the system 200 may analyze the job site locations in the equipment records to determine whether to update drawings or schematics maintained by the entity. In this regard, the entity may maintain engineering drawings or similar schematics indicating the location of structures, devices, and/or the like that have been constructed and/or maintained by the entity. Based on job site location and other information contained in equipment records, the system 200 may determine that construction and/or maintenance work was performed at a particular location. If such location is not consistent with (e.g., match) engineering drawings or similar schematics of the entity, the system 200 may automatically update such engineering drawings or similar schematics to include the correct location and/or flag such engineering drawings or similar schematics for further review by a user.

In some embodiments, equipment records may be analyzed by the system 200 to determine aggregate productivity and other information related to various pieces of equipment and personnel. For example, the system 200 may determine aggregate information related to the total time spent at a job site, at a yard, or performing other activities (e.g., "gas", "restaurant", "hardware", and "travel" time). The system 200 may determine aggregate information related to the quantity of tasks performed. The system 200 may determine aggregate information related to the types and amount of delay experienced. Information may be aggregated for: a single piece of equipment over multiple time periods (e.g., over multiple days); individual personnel (e.g., a crew leader) or a group of personnel (e.g., a crew) over multiple time periods; a yard over a single time period (e.g., day) or multiple time periods (e.g., by aggregating all equipment records assigned to such yard); a geographic region; a customer; or based on other collected information. For example, the system 200 may determine the average daily "yard," "job site," and "travel time" for a piece of equipment over a week or month. The system 200 may determine the average daily delay time across different categories of delay experienced by a crew over a week or month. By way of further example, the system 200 may determine the average daily productivity (e.g., average quantity of various tasks) of all equipment assigned to a particular yard during a particular month. The system 200 may compare the productivity of different individuals and crews to determine which individuals and/or crews are more or less efficient. Based on the relative efficiency of different individuals and/or crews, such individuals and/or crews may be assigned different tasks or prompted to perform additional training.

This aggregate information may be provided to one or more users (e.g., employees of the entity). In some instances, this aggregate information may be provided to customers of the entity. In some embodiments, aggregate information may be delivered to or accessible via a user's mobile device (e.g., smartphone or tablet computer). In some embodiments, this aggregate information may be accessible via an Internet-accessible portal providing such information in a graphical user interface. Such portal may allow users to make queries and generate reports and graphical presentations. In some embodiments, such portal and the information available may be customized for different customers. In other embodiments, reports based on the aggregate information may be provided to user based on predefined templates. In some embodiments, this aggregate information may be presented to users in the form of a heat map.

FIG. 4 depicts an exemplary graphical user interface that may be used to provide aggregate information. The graphical user interface depicted in FIG. 4 allows a user to select a time period (e.g., week or month), yard, and crew work type for which the user desires to see aggregate information. For the selected time period, yard, and crew work type, the graphical user interface provides: the quantity of crews, average yard, job, and travel time, information about the quantity of tasks completed, and information about experienced delays.

In some instances, customers of the entity may allocate costs of work to different cost centers (e.g., "operations and maintenance" versus "capital" costs). In some embodiments, the system may analyze aggregate information contained in equipment records (e.g., by analyzing information such as a project identifier; the type of work performed; and an identity of a customer), to determine the aggregate costs related to different customer cost center. Accordingly, the system may be able to generate a report detailing "operations and maintenance" versus "capital" costs (as well as associated tasks completed) for a particular customer. Such report may then be provided to such customer.

In some embodiments, aggregate information may be used to identify trends and project future needs or problems. For example, the aggregate information be able to identify trends in the types of work performed by the entity, such as by season, location, or geographic region, which may be used to project future work expectations. Based on future work expectations, the system 200 may be able to suggest locations for new yards (e.g., that would reduce costs and/or travel time to expected future work), as well as the types and volume of equipment and materials needed to meet such future work expectations. Aggregate information may be analyzed to identify variables (e.g., weather, location, traffic, personnel, etc.) that drive productivity or delays. Based on variables determined to cause delays, the system 200 may be able to project expected delays for future projects. For example, if telematic data indicates that travel time is unexpectedly high for projects within a given region, then this information can be used in determining expected delays (and associated costs) for other projects in the same region. In some embodiments, the system 200 may analyze the history of work performed to address prior natural disasters (e.g., storms) to project the amount and location of work that will need to be performed to repair damage from a similar expected natural disaster. Based on such projected work and the expect path of such expected natural disaster, the entity may be able to pre-stage equipment and personnel to more promptly repair damage.

In some embodiments, the system 200 may calculate the estimated productivity (e.g., expected quantity of various tasks) for particular equipment or personnel over a particular time period and compare the estimated productivity to the actual productivity (e.g., actual quantity of various tasks completed). The estimated productivity may be based on the average productivity across the entity, adjusted for various factors such as weather, delays, job site time, geographic region, yard, crew leader, and/or the like that may affect productivity. In this regard, regression analysis may be performed by the system 200 to create a model for calculating estimated productivity. The system 200 may then provide users with information regarding the estimated productivity and actual productivity (e.g., for a piece of equipment, group of personnel, type of task, etc.). In some embodiments, the system may be configured to calculate efficiency scores for personnel and equipment. Where the actual productivity for equipment or personnel exceeds the estimated productivity, such equipment or personnel may have a relatively high efficiency score, whereas if the actual productivity for equipment or personnel is below the estimated productivity, such equipment or personnel may have a relatively low efficiency score.

As described above, the system described herein may be used in a variety of fields, including electrical line work. The system may be useful in the construction industry. For example, an entity may have multiple foremen and project operating at the same time, and so the system could be used to track multiple crews based on location and tool usage to determine time at the construction site and what was being done based on the tools used. The system may also be useful in the logging industry. In this regard, the system may track and determine that logging was performed within the bounds of an area allotted to logging and that the correct trees were harvested. The system may also be able used for (i) identify safety improvements based on tracking tool/equipment usage and safety incidents reported and (ii) tracking the planting, growth, and harvesting of tree having RFID tags. In the fishing industry, the system may be used to track where nets are dropped and how much is caught, as well as various data such as weather data, ocean temperature, and the like. Based on this historic data as well as current data, the system may be able to predict catch amounts. With respect to cleaning, maintenance, and similar services, the system could be used to track spent at a job site (e.g., based on usage of RFID tagged tools, arrival time, etc.).

As evident from the preceding description, the system described herein represents an improvement in current technology. As described above, there are various problems associated with identifying the location of a job site. Accordingly, the system typically receives telematic data from a piece of equipment, including location information, as well as information about the use of various tools associated with such equipment that are primarily designed for use at a job site. Accordingly, the system may analyze such telematic data to determine whether tools are being used in a manner indicative of such equipment being used at a job site. If such tools are being used in such a manner, then the system knows that such equipment is located at a job site. Accordingly, if such equipment is not located at a previously defined job site, then the system may define the current location of such equipment as a new job site. Therefore, the system may be able to automatically determine the locations of job sites, and then use such locations to determine whether, at any given time, equipment (as well as personnel associated with such equipment) is being used to perform work at a job site. Accordingly, the system provides a technical solution for overcoming the problem of how to automatically identify new job sites.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system comprising:
a piece of equipment, wherein the piece of equipment is a piece of construction equipment, the piece of construction equipment comprising one or more sensors that collect telematic data associated with the piece of construction equipment; and
a system for collecting and analyzing equipment telematic data, comprising:
a computer apparatus including one or more processors, a memory, and a network communication interface; and
an analysis module stored in the memory, executable by the one or more processors and configured for:
receiving, via the network communication interface, telematic data from the piece of equipment;
parsing the telematic data to identify (i) location information and (ii) usage information for one or more tools associated with the equipment;
analyzing the telematic data to determine whether a job site condition has been satisfied;
determining that the job site condition has been satisfied;
determining that a first job site location of the equipment is a new job site in response to (1) determining that the job site condition has been satisfied, wherein determining that the job site condition has been satisfied comprises determining that the one or more tools have been used, (2) identifying the first job site location based on the location information of the telematic data, (3) retrieving location information for existing job sites from a job site database, and (4) determining that the first job site location is not within one of the existing job sites, wherein the one or more tools comprises a handheld tool, wherein determining that the one or more tools have been used comprises:
detecting, from the telematic data, that the handheld tool has lost a wireless connection to the equipment;
based on detecting that the handheld tool has lost the wireless connection to the equipment, determining that the handheld tool has left the equipment; and
based on detecting that the handheld tool has left the equipment, determining that the handheld tool is in use;
in response to determining that the first job site location is a new job site, updating the job site database to include the first job site location;
generating aggregated data based on the telematic data and an equipment record associated with the piece of equipment; and
presenting the aggregated data on a user computing device through a portal comprising a graphical user interface, wherein the portal is configured to allow a user to generate a report associated with the piece of equipment, wherein the report includes information related to time spent by the piece of equipment at one or more job site locations in the job site database, the one or more job site locations including the first job site location.

2. The system according to claim 1, wherein analyzing the telematic data to determine whether a job site condition has been satisfied comprises using a machine learning algorithm to determine whether the job site condition has been satisfied.

3. The system according to claim 1, wherein the analysis module is configured for:
receiving, via the network communication interface, image data from the piece of equipment; and
analyzing the image data;
wherein determining that the job site condition has been satisfied is based at least in part on analyzing the image data.

4. The system according to claim 3, wherein analyzing the image data comprises identifying one or more objects associated with the job site condition.

5. The system according to claim 1, wherein the telematic data comprises a plurality of telematic datasets.

6. The system according to claim 5, wherein the analysis module is configured for determining an activity and/or location associated with each of the telematic datasets.

7. The system according to claim 6, wherein the analysis module is configured for determining a total time the piece of equipment is associated with each of a plurality of activities and/or locations.

8. The system according to claim 6, wherein the analysis module is configured for determining a total time the piece of equipment spent at the first job site location during a defined time period.

9. The system according to claim 1, wherein determining that the job site condition has been satisfied comprises detecting (1) that the equipment is stationary for a defined period of time and (2) that the equipment is not located at a defined job site or non-yard site, wherein the non-yard site is a restaurant, gas station, or store.

10. A computer implemented method for collecting and analyzing equipment telematic data, comprising:
receiving, via one or more computer processors, telematic data from a piece of equipment, wherein the piece of equipment is a piece of construction equipment, the piece of construction equipment comprising one or more sensors that collect telematic data associated with the piece of construction equipment;
parsing, via one or more computer processors, the telematic data to identify (i) location information and (ii) usage information for one or more tools associated with the equipment;
analyzing, via one or more computer processors, the telematic data to determine whether a job site condition has been satisfied;
determining, via one or more computer processors, that the job site condition has been satisfied;
determining that a first job site location of the equipment is a new job site in response to (1) determining that the job site condition has been satisfied, wherein determining that the job site condition has been satisfied comprises determining that the one or more tools have been used, (2) identifying the first job site location based on the location information of the telematic data, (3) retrieving location information for existing job sites from a job site database, and (4) determining that the first job site location is not within one of the existing job sites, wherein the one or more tools comprises a handheld tool, wherein determining that the one or more tools have been used comprises:
detecting, from the telematic data, that the handheld tool has lost a wireless connection to the equipment;

based on detecting that the handheld tool has lost the wireless connection to the equipment, determining that the handheld tool has left the equipment; and based on detecting that the handheld tool has left the equipment, determining that the handheld tool is in use;

in response to determining that the first job site location is a new job site, updating the job site database to include the first job site location;

generating aggregated data based on the telematic data and an equipment record associated with the piece of equipment; and presenting the aggregated data on a user computing device through a portal comprising a graphical user interface, wherein the portal is configured to allow a user to generate a report associated with the piece of equipment, wherein the report includes information related to time spent by the piece of equipment at one or more job site locations in the job site database, the one or more job site locations including the first job site location.

11. The method according to claim 10, wherein analyzing the telematic data to determine whether a job site condition has been satisfied comprises using a machine learning algorithm to determine whether the job site condition has been satisfied.

12. The method according to claim 10, comprising:
receiving, via a network communication interface, image data from the piece of equipment; and
analyzing the image data;
wherein determining that the job site condition has been satisfied is based at least in part on analyzing the image data.

13. The method according to claim 12, wherein analyzing the image data comprises identifying one or more objects associated with the job site condition.

14. The method according to claim 10, wherein the telematic data comprises a plurality of telematic datasets.

15. The method according to claim 14, comprising determining an activity and/or location associated with each of the telematic datasets.

16. The method according to claim 15, comprising determining a total time the piece of equipment is associated with each of a plurality of activities and/or locations.

17. The method according to claim 15, comprising determining a total time the piece of equipment spent at the first job site location during a defined time period.

18. A computer program product for collecting and analyzing equipment telematic data, wherein the computer program product comprises a non-transitory computer-readable medium comprising computer-readable instructions, the computer-readable instructions, when executed by a computer processor, cause the computer processor to perform the steps of:

receiving telematic data from a piece of equipment, wherein the piece of equipment is a piece of construction equipment, the piece of construction equipment comprising one or more sensors that collect telematic data associated with the piece of construction equipment;

parsing the telematic data to identify (i) location information and (ii) usage information for one or more tools associated with the equipment;

analyzing the telematic data to determine whether a job site condition has been satisfied;

determining that the job site condition has been satisfied;

determining that a first job site location of the equipment is a new job site in response to (1) determining that the job site condition has been satisfied, wherein determining that the job site condition has been satisfied comprises determining that the one or more tools have been used, (2) identifying the first job site location based on the location information of the telematic data, (3) retrieving location information for existing job sites from a job site database, and (4) determining that the first job site location is not within one of the existing job sites, wherein the one or more tools comprises a handheld tool, wherein determining that the one or more tools have been used comprises:

detecting, from the telematic data, that the handheld tool has lost a wireless connection to the equipment;

based on detecting that the handheld tool has lost the wireless connection to the equipment, determining that the handheld tool has left the equipment; and based on detecting that the handheld tool has left the equipment, determining that the handheld tool is in use;

in response to determining that the first job site location is a new job site, updating the job site database to include the first job site location;

generating aggregated data based on the telematic data and an equipment record associated with the piece of equipment; and presenting the aggregated data on a user computing device through a portal comprising a graphical user interface, wherein the portal is configured to allow a user to generate a report associated with the piece of equipment, wherein the report includes information related to time spent by the piece of equipment at one or more job site locations in the job site database, the one or more job site locations including the first job site location.

* * * * *